US010848770B2

(12) United States Patent
Kubota

(10) Patent No.: US 10,848,770 B2
(45) Date of Patent: Nov. 24, 2020

(54) MOVING PICTURE CODING APPARATUS, MOVING PICTURE CODING METHOD AND RECORDING MEDIUM ON WHICH PROGRAM FOR MOVING PICTURE CODING IS RECORDED

(71) Applicant: FUJITSU LIMITED, Kawasaki (JP)

(72) Inventor: Tomonori Kubota, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 69 days.

(21) Appl. No.: 16/209,356

(22) Filed: Dec. 4, 2018

(65) Prior Publication Data

US 2019/0200024 A1  Jun. 27, 2019

(30) Foreign Application Priority Data

Dec. 22, 2017  (JP) ................. 2017-246353

(51) Int. Cl.
*H04N 19/172* (2014.01)
*H04N 19/103* (2014.01)
*H04N 19/142* (2014.01)
*H04N 19/149* (2014.01)
*H04N 19/176* (2014.01)
*H04N 19/124* (2014.01)
*H04N 19/132* (2014.01)
*H04N 19/14* (2014.01)
(Continued)

(52) U.S. Cl.
CPC ......... *H04N 19/172* (2014.11); *H04N 19/103* (2014.11); *H04N 19/115* (2014.11); *H04N 19/124* (2014.11); *H04N 19/132* (2014.11); *H04N 19/137* (2014.11); *H04N 19/14* (2014.11); *H04N 19/142* (2014.11); *H04N 19/149* (2014.11); *H04N 19/176* (2014.11)

(58) Field of Classification Search
None
See application file for complete search history.

(56) References Cited

U.S. PATENT DOCUMENTS

2003/0202706 A1\* 10/2003 Uchibayashi ............. G06T 9/00
                                                                 382/236
2014/0226724 A1\*  8/2014 Sorin .................... H04N 19/137
                                                              375/240.16

FOREIGN PATENT DOCUMENTS

| JP | 2004-193990 | 7/2004 |
| JP | 2004193990 A \* | 7/2004 |
| JP | 2007-325109 | 12/2007 |

(Continued)

*Primary Examiner* — William C Vaughn, Jr.
*Assistant Examiner* — Joseph Daniel A Towe
(74) *Attorney, Agent, or Firm* — Fujitsu Patent Center

(57) ABSTRACT

An information processing apparatus includes a memory and a processor which changes a frame rate in a period of moving picture data to a first set value of the frame rate, codes respective pictures in the period to obtain a code amount according to the first set value, calculates a cumulative value of a code amount of each kind of pictures different in applicable coding processing regarding the respective pictures included in the period, calculates a ratio of the cumulative value, estimates a change tendency of a difficulty level of coding of respective pictures in a next period after the period based on transition of the frame rate and transition of the ratio of the cumulative value, and obtains a second set value of the frame rate and a third set value of a bit rate applied to the next period according to the change tendency of the difficulty level.

20 Claims, 12 Drawing Sheets

(51) Int. Cl.
*H04N 19/115* (2014.01)
*H04N 19/137* (2014.01)

(56) References Cited

FOREIGN PATENT DOCUMENTS

JP 2007325109 A * 12/2007
WO 2008-108379 9/2008

* cited by examiner

FIG. 5

|  |  | PRESENT fps □ SETTING fps | | | |
|---|---|---|---|---|---|
|  |  | > | = | < | TENDENCY |
| PREVIOUS CODE AMOUNT RATIO | > | A | B | C | MOTION PREDICTION COMES TRUE MORE READILY or EASY SCENE |
|  | = | A | B | C | EQUIVALENT |
| PRESENT CODE AMOUNT RATIO | < | A | A | A | MOTION PREDICTION COMES TRUE LESS READILY or DIFFICULT SCENE |
|  |  | DIFFERENCE BECOMES LARGER | EQUIVALENT | DIFFERENCE DECREASES |  |
|  |  | TENDENCY | | | |

500

* □ IS EQUALITY OR INEQUALITY SIGN

FIG. 9

| PREVIOUS ALLOWABLE bps □ PRESENT ALLOWABLE bps | TENDENCY | BAND |
|---|---|---|
| > | A | TRANSITION IN NARROWING DIRECTION |
| = | B | EQUIVALENT |
| < | C | TRANSITION IN BROADENING DIRECTION |

* □ IS EQUALITY OR INEQUALITY SIGN

900

MOVING PICTURE CODING APPARATUS, MOVING PICTURE CODING METHOD AND RECORDING MEDIUM ON WHICH PROGRAM FOR MOVING PICTURE CODING IS RECORDED

CROSS-REFERENCE TO RELATED APPLICATION

This application is based upon and claims the benefit of priority of the prior Japanese Patent Application No. 2017-246353, filed on Dec. 22, 2017, the entire contents of which are incorporated herein by reference.

FIELD

The embodiments discussed herein are related to a moving picture coding apparatus, a moving picture coding method, and a recording medium on which a program for moving picture coding is recorded.

BACKGROUND

Moving picture data has an enormously-large data amount. For this reason, an apparatus that treats moving picture data compresses the moving picture data by coding the moving picture data in the case of attempting to transmit the moving picture data to another apparatus or in the case of attempting to store the moving picture data in a storing apparatus. As representative coding standards of the moving picture, advanced video coding (MPEG-4 AVC|ITU-T H.264) and high efficiency video coding (HEVC|ITU-T H.265) have been formulated.

A related art is disclosed in Japanese Laid-open Patent Publication No. 2004-193990, International Publication Pamphlet No. WO 2008/108379, or Japanese Laid-open Patent Publication No. 2007-325109.

SUMMARY

According to an aspect of the embodiments, an information processing apparatus includes: a memory; and a processor coupled to the memory and configured to: change a frame rate in a given period of moving picture data to a first set value of the frame rate; code respective pictures included in the given period in which the frame rate is changed in such a manner that a code amount according to the first set value is obtained; calculate a cumulative value of a code amount of each of kinds of pictures different in applicable coding processing regarding the respective pictures included in the given period; calculate a ratio of the cumulative value of the code amount of each of the kinds of pictures; estimate a change tendency of a difficulty level of coding of respective pictures included in a next period after the given period based on transition of the frame rate and transition of the ratio of the cumulative value of the code amount; and obtain a second set value of the frame rate and a third set value of a bit rate that are applied to the next period according to the change tendency of the difficulty level.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates one example of a table that represents a relationship between a transition of a code amount ratio and a transition of a frame rate and a change tendency of a difficulty level of coding estimated about a next period;

FIG. 9 illustrates one example of a table that represents a relationship between a transition of an allowable bit rate and a change tendency of a transmission bandwidth estimated about a next period;

DESCRIPTION OF EMBODIMENTS

Figure 1:
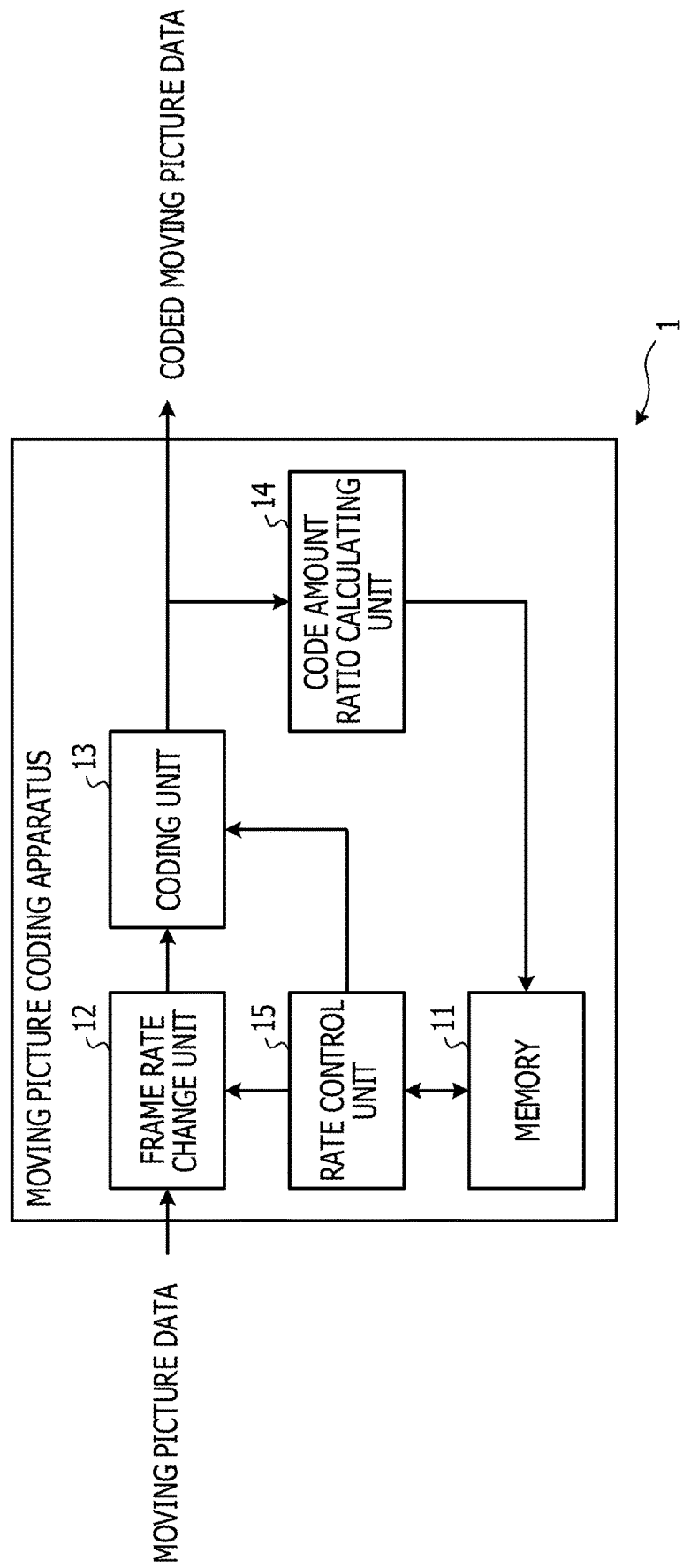
FIG. 1 illustrates one example of a moving picture coding apparatus.

When transmitting coded moving picture data to a moving picture decoding apparatus through a communication path, a moving picture coding apparatus is desired to properly set the frame rate of the moving picture data and the bit rate corresponding to the code amount according to the transmission bandwidth of the communication path. For example, when an excess bit rate with respect to the transmission bandwidth is set, so-called underflow, in which, regarding any picture included in the moving picture data, coded data of the picture has not been accumulated in a buffer of the moving picture decoding apparatus by the scheduled clock time when the picture is decoded, occurs in some cases. When the underflow occurs, the moving picture decoding apparatus does not decode the picture at the scheduled clock time of the decoding. For example, if a too-low bit rate or frame rate with respect to the transmission bandwidth is set, although the picture quality of decoded moving picture data obtained by decoding the coded moving picture data may be improved, the picture quality remains low. For this reason, for example, the frame rate or the bit rate is controlled in the moving picture coding apparatus.

For example, the frame rate is adjusted according to whether or not moving picture data to be transmitted is an image whose change is large on each frame basis. For example, future band variation in a certain period is predicted from the coupling environment of a receiving terminal and the present band and the optimum bit rate is decided band on the predicted band variation and resources that may be used by the receiving terminal. For example, a distribution server classifies plural pieces of video stream data into groups and lowers the bit rate of specific stream data in the same group.

The difficulty level of coding changes on each picture basis according to the complexity of the scene represented on the picture included in moving picture data, the degree of change in the scene between pictures in order of reproduction, and so forth. With a picture regarding which the difficulty level of coding is higher, the code amount desired for ensuring certain picture quality about the picture in decoded moving picture data increases to a larger extent. For this reason, it is preferable for the moving picture coding apparatus to consider the transmission bandwidth, and besides, the difficulty level of coding of each picture included in moving picture data in order to set the optimum frame rate and bit rate. However, depending on a coding engine that executes coding processing of the moving picture data, it is often difficult to obtain information relating to the scene of each picture from the external of the coding engine and it is often difficult to change the setting of parameters of an algorithm for controlling the frame rate and the bit rate. For this reason, it might be difficult for the moving picture coding apparatus to properly set the optimum bit rate and frame rate.

For example, a moving picture coding apparatus that properly controls the frame rate and the bit rate when moving picture data is coded may be provided.

This moving picture coding apparatus carries out control to adjust the frame rate and the bit rate applied when moving picture data is coded at each given cycle. Depending on the coding engine, it is often difficult to obtain information relating to the scene of each picture from the external of the coding engine. Moreover, depending on the coding engine, it is difficult to change the setting of parameters of the algorithm for controlling the frame rate and the bit rate and only mere specifying of the frame rate or the bit rate itself is possible in some cases.

Thus, this moving picture coding apparatus estimates the change tendency of the difficulty level of coding based on the transition of the frame rate and the transition of the ratio of the code amount of each kind of coded picture so that the frame rate and the bit rate may be optimized even when such a coding engine is used. This moving picture coding apparatus adjusts the frame rate or the bit rate according to the estimated change tendency of the difficulty level.

FIG. 1 illustrates one example of a moving picture coding apparatus. A moving picture coding apparatus 1 includes a memory 11, a frame rate change unit 12, a coding unit 13, a code amount ratio calculating unit 14, and a rate control unit 15. These respective units which the moving picture coding apparatus 1 includes are each implemented in the moving picture coding apparatus 1 as a separate circuit. Alternatively, these respective units which the moving picture coding apparatus 1 includes may be implemented in the moving picture coding apparatus 1 as one or plural integrated circuits into which circuits that implement functions of the respective units are integrated. Alternatively, these respective units which the moving picture coding apparatus 1 includes may be function modules implemented by a computer program executed on a processor which the moving picture coding apparatus 1 includes.

When coding moving picture data, the moving picture coding apparatus 1 controls the frame rate and the bit rate at each given cycle to suppress the occurrence of underflow in moving picture decoding apparatus to which coded moving picture data is transmitted and the deterioration of the picture quality of decoded moving picture data.

Figure 2:
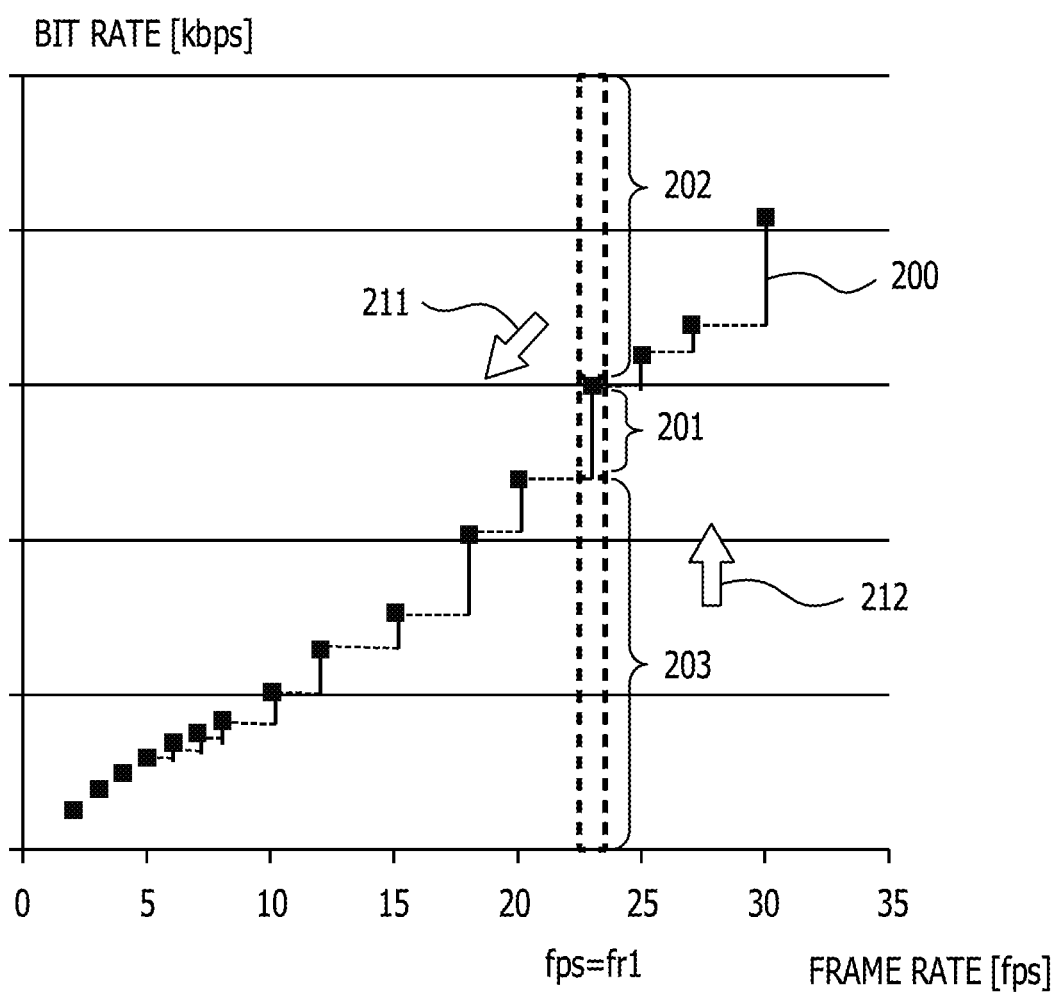
FIG. 2 illustrates one example of a relationship between a frame rate and a bit rate that are set in advance and a bit rate according to a code amount obtained as a result of coding processing.

FIG. 2 illustrates one example of a relationship between a frame rate and a bit rate that are set in advance and a bit rate according to a code amount obtained as a result of coding processing. In FIG. 2, the abscissa axis represents the frame rate and the ordinate axis represents the bit rate. A graph 200 represents the relationship between the frame rate and the bit rate that are set in advance. The relationship between the frame rate and the bit rate illustrated in the graph 200 is decided by obtaining the bit rate with which certain picture quality (hereinafter, often referred to as designed picture quality) is ensured about decoded moving picture data regarding each frame rate statistically, for example.

For example, if the frame rate is set to fr1, a range 201 of the bit rate corresponding to the frame rate fr1 in the graph 200 is the range of the bit rate with which the designed picture quality is ensured. Therefore, in the case in which the frame rate is set to fr1, the designed picture quality is ensured about decoded moving picture data if the bit rate according to the code amount obtained as the result of moving picture coding processing is included in the range 201. Underflow does not occur in moving picture decoding apparatus if the bit rate according to the obtained code amount is equal to or lower than the allowable bit rate corresponding to the transmission bandwidth of a communication path to which coded moving picture data is transmitted.

However, if the difficulty level of coding of a picture included in moving picture data is higher than an envisaged difficulty level, the bit rate according to the code amount obtained as the result of moving picture processing is included in a range 202 higher than the range 201 in some cases. In such a case, if only the set value of the bit rate is lowered without changing the frame rate, the picture quality of each picture included in decoded moving picture data deteriorates compared with the designed picture quality. Thus, the moving picture coding apparatus 1 lowers the frame rate as illustrated by an arrow 211. Due to this, although the continuity of the scene between pictures is lowered, the code amount that may be allocated to the individual pictures increases and thus the deterioration of the picture quality of each picture included in the decoded moving picture data is suppressed.

On the other hand, if the difficulty level of coding of a picture included in moving picture data is lower than an envisaged difficulty level, the bit rate according to the code amount obtained as the result of moving picture processing is included in a range 203 lower than the range 201 in some cases. In such a case, there is room in the transmission bandwidth and thus the moving picture coding apparatus 1 increases the set value of the bit rate as illustrated by an arrow 212. This increases the code amount that may be allocated to the individual pictures and therefore improves the picture quality of each picture included in decoded moving picture data.

Details of the respective units of the moving picture coding apparatus 1 will be described below.

The memory 11 is one example of a storing unit and stores various kinds of data used for execution of rate control processing executed by the moving picture coding apparatus 1 and various kinds of data generated in execution of the rate control processing. For example, the memory 11 stores a rate reference table that represents the relationship between the frame rate and the bit rate (for example, equivalent to the graph 200 in FIG. 2), the cumulative value of the code amount of each picture type and the ratio thereof, set values of the frame rate in the present and the past, and so forth.

Every time a set value of the frame rate is notified to the frame rate change unit 12 by the rate control unit 15, the frame rate change unit 12 changes the frame rate of moving picture data to the notified set value of the frame rate. For example, if the set value of the frame rate is lower than the frame rate of original moving picture data, the frame rate change unit 12 decimates pictures from the original moving picture data in such a manner that the number of pictures per unit time becomes the number according to the set value of the frame rate. As substitutes for the decimated pictures, the frame rate change unit 12 copies the pictures that are immediately previous in order of reproduction and are not decimated, for example, and inserts the copied pictures.

Figure 3:
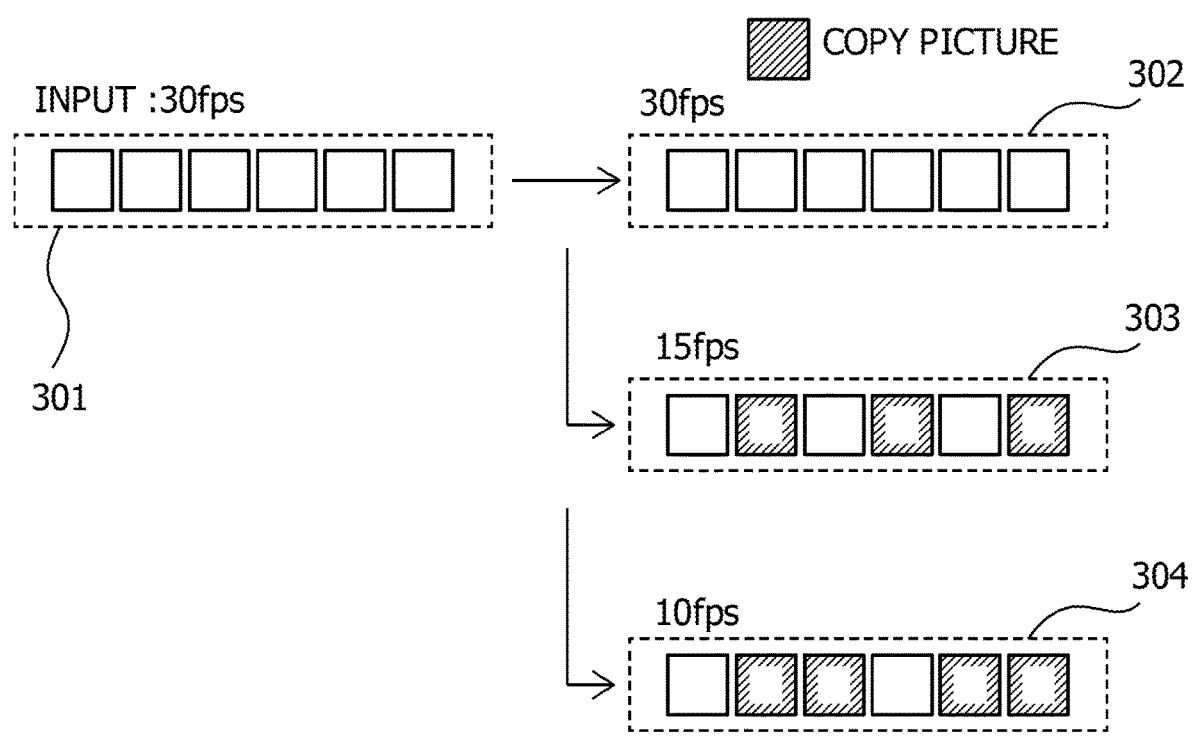
FIG. 3 illustrates one example of frame rate change.

FIG. 3 illustrates one example of frame rate change. In FIG. 3, the respective blocks represented by solid lines each represent one picture and the numbers in the blocks represent the order of reproduction of the pictures. When the frame rate of original moving picture data 301 is 30 fps and the set value of the frame rate is also 30 fps, the respective pictures included in the original moving picture data 301 are output as they are in moving picture data 302 after rate change. On the other hand, if the set value of the frame rate is 15 fps and is half the frame rate of the original moving picture data 301, every second picture is decimated in moving picture data 303 after rate change. In this example, among the pictures included in the original moving picture data 301, picture 2, picture 4, and picture 6 are decimated. Instead, picture 1, picture 3, and picture 5 are each copied and are inserted as substitutes for picture 2, picture 4, and picture 6. If the set value of the frame rate is 10 fps and is ⅓ of the frame rate of the original moving picture data 301, two pictures out of every three pictures are decimated in the moving picture data 304 after rate change. In this example, among the pictures included in the original moving picture data 301, picture 2, picture 3, picture 5, and picture 6 are decimated. Instead, picture 1 and picture 4 are each copied and are inserted as substitutes for picture 2, picture 3, picture 5, and picture 6. The copied pictures are coded as skip frames by the coding unit 13 and thus the code amount for the copied picture is comparable to the code amount of a flag representing that the picture is a skip frame.

By carrying out decimation and copying of pictures in the above-described manner, the frame rate change unit 12 may change the frame rate in a pseudo manner even when only transmission at a fixed frame rate is permitted due to functional limitations of moving picture decoding apparatus on the receiving side or limitations attributed to operation regulations and so forth.

If transmission at a variable frame rate is permitted regarding moving picture decoding apparatus on the receiving side, the frame rate change unit 12 may change the frame rate of original moving picture data to a set frame rate in accordance with another frame rate change method. For example, the frame rate change unit 12 may decimate any of pictures included in the original moving picture data in such a manner that the number of pictures per unit time becomes the number corresponding to the set frame rate. Alternatively, the frame rate change unit 12 may make synthetic pictures obtained by executing interpolation processing with use of plural pictures that are included in the original moving picture data and are lined up in order of reproduction be included in the moving picture data as substitutes for the plural pictures.

The frame rate change unit 12 outputs each picture of moving picture data after frame rate change to the coding unit 13.

The coding unit 13 codes each picture of the moving picture data after frame rate change in such a manner that a code amount according to a notified set value of the bit rate is obtained. The coding unit 13 may code each picture included in the moving picture data after frame rate change in accordance with any of various coding standards such as MPEG-2, MPEG-4, H.264/MPEG-4 AVC, or H.265. For example, the coding unit 13 divides a picture to which attention is paid into plural blocks and, regarding each block, generates a predictive block of the block from another picture that has been already coded or a region that has been already coded in the picture to which attention is paid in accordance with a predictive coding mode that may be applied. Regarding each block, the coding unit 13 calculates the difference values between corresponding pixels of the block and the predictive block as a predictive error signal. Then, the coding unit 13 carries out an orthogonal transform of the predictive error signal to calculate orthogonal transform coefficients and quantize the orthogonal transform coefficients. At this time, the coding unit 13 may set a quantization parameter that defines a quantization scale in accordance with a target information amount according to a set bit rate and quantize the orthogonal transform coefficients according to the set quantization parameter. Moreover, regarding each block, the coding unit 13 carries out entropy coding of the quantized orthogonal transform coefficients, the quantization parameter, various kinds of parameters for generating the predictive block, and so forth. The coding unit 13 makes the orthogonal transform coefficients, the quantization parameter, and the various kinds of parameters subjected to the entropy coding regarding each block be included in coded data of the picture to which attention is paid. Furthermore, regarding each block, the coding unit 13 carries out inverse quantization and inverse orthogonal transform of the quantized orthogonal transform coefficients to restore the predictive error signal so that reference to a block or picture subsequent in order of coding may be possible. Regarding each block, the coding unit 13 adds the values of the corresponding pixels of the predictive block corresponding to the restored predictive error signal to decode the block.

The coding unit 13 may set the target information amount and the quantization parameter according to the set bit rate for each picture in accordance with the MPEG-2 Test Model 5, for example. Regarding a calculation method of the target information amount and the quantization parameter, refer to a URL specified as http://www.mpeg.org/MPEG/MSSG/tm5/Ch10/Ch10.html, for example. Alternatively, the coding unit 13 may set the target information amount and the quantization parameter in accordance with another bit rate control method.

The coding unit 13 outputs coded moving picture data including data of each coded picture to a buffer (not illustrated) which the moving picture coding apparatus 1 includes. The coded moving picture data is transmitted to moving picture decoding apparatus via a communication path at the allowable bit rate according to the usable transmission bandwidth.

In each period according to the given cycle, the code amount ratio calculating unit 14 calculates the cumulative value of the code amount of each of kinds of pictures different in coding processing that may be applied regarding each coded picture output from the coding unit 13. The code amount ratio calculating unit 14 calculates the ratio of the cumulative value of the code amount of each kind of picture.

In the present embodiment, the code amount ratio calculating unit 14 obtains the cumulative value of the code amount about each of the I picture, to which the intra-predictive coding mode is applied, and the P picture and the B picture, to which the intra-predictive coding mode, and besides, the inter-predictive coding mode may be applied. The code amount ratio calculating unit 14 calculates the ratio of the cumulative value of the code amount about the P picture and the B picture to the cumulative value of the code amount about the I picture. The intra-predictive coding mode is a coding system in which a coding target picture is coded by using only information in the coding target picture. The inter-predictive coding mode is a coding system in which a coding target picture is coded by using information on another picture that has been already coded. The P picture is a picture for which prediction in only a single direction is carried out and the B picture is a picture for which bidirectional prediction is carried out. If the B picture is not used because of limitations in delay or limitations in the arithmetic amount, the code amount ratio calculating unit 14 may calculate the ratio of the cumulative value of the code amount about the P picture to the cumulative value of the code amount about the I picture.

The ratio of the cumulative value of the code amount about the P picture and the B picture to the cumulative value of the code amount about the I picture (hereinafter, for convenience, referred to as the code amount ratio) is used for an estimation of the change tendency of the difficulty level of coding of the picture. The code amount of a picture to which the inter-predictive coding mode is applied is smaller than the code amount of the picture to which the intra-predictive coding mode is applied. If the inter-predictive coding mode is applied about a coding target block of a picture to which attention is paid and a region similar to the block exists on another picture that has been already coded based on motion prediction, the predictive error signal becomes smaller and therefore the code amount of the P picture and the B picture becomes smaller. Conversely, the code amount of the P picture and the B picture increases if a region similar to the coding target block is not found on another picture that has been already coded even based on motion prediction or if the intra-predictive coding mode is applied to the coding target block. When the scene on a picture is more complicated, the code amount of the picture increases to a larger extent. The number of P pictures and B pictures is larger than the number of I pictures per certain period. Therefore, it is envisaged that the difficulty level of coding of each picture in the period regarding which the code amount ratio is calculated is lower when the code amount ratio is lower.

Because the code amount about the copy picture is very small, the code amount ratio calculating unit 14 may calculate the code amount ratio excluding the code amount about the copy picture. The code amount ratio calculating unit 14 may employ a period corresponding to a group of pictures (GOP), a period corresponding to an access unit (AU), or a period corresponding to plural AUs, for example, as the given period serving as the unit of calculation of the code amount ratio.

Figure 4:
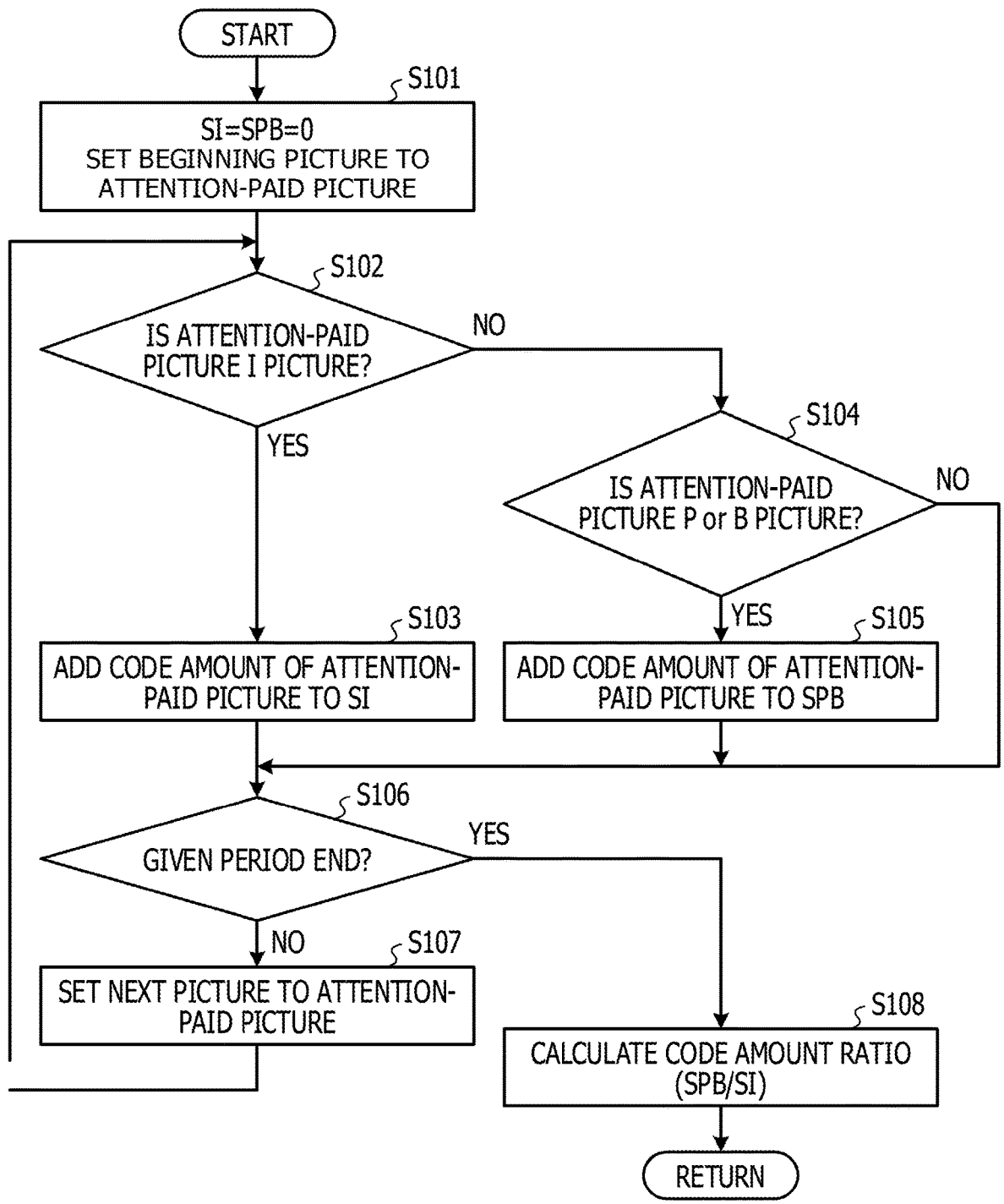
FIG. 4 illustrates one example of code amount ratio calculation.

FIG. 4 illustrates one example of code amount ratio calculation. When the given period is started, the code amount ratio calculating unit 14 resets the cumulative value of the code amount of each picture type to 0 and sets the beginning picture of the given period to the picture to which attention is paid (step S101). As the start timing of the given period, for example, in the case of a GOP, the timing when coded data of an I picture is output may be employed. Alternatively, in the case of an access unit, the timing when an AU delimiter appears in coded moving picture data may be employed.

The code amount ratio calculating unit 14 determines whether or not the type of the picture to which attention is paid is the I picture (step S102). If the type of the picture to which attention is paid is the I picture (step S102-Yes), the code amount ratio calculating unit 14 adds the code amount of the picture to which attention is paid to a cumulative value SI of the code amount about the I picture (step S103).

On the other hand, if the type of the picture to which attention is paid is not the I picture (step S102-No), the code amount ratio calculating unit 14 determines whether or not the type of the picture to which attention is paid is the P picture or the B picture (step S104). If the type of the picture to which attention is paid is the P picture or the B picture (step S104-Yes), the code amount ratio calculating unit 14 adds the code amount of the picture to which attention is paid to a cumulative value SPB of the code amount about the P picture and the B picture (step S105). On the other hand, if the type of the picture to which attention is paid is neither the P picture nor the B picture (step S104-No), for example, if the picture to which attention is paid is a copy picture, the code amount ratio calculating unit 14 adds the code amount of the picture to which attention is paid to neither cumulative value.

After the step S103 or S105 or if the type of the picture to which attention is paid in the step S104 is neither the P picture nor the B picture (step S104-No), the code amount ratio calculating unit 14 determines whether or not the given period has ended (step S106).

If the given period has not ended (step S106-No), the code amount ratio calculating unit 14 sets the picture next to the picture to which attention is paid in order of coding as the picture to which attention is paid (step S107). Thereafter, the code amount ratio calculating unit 14 repeats the processing of the step S102 and the subsequent steps.

On the other hand, if the given period has ended (step S106-Yes), the code amount ratio calculating unit 14 calculates the ratio of the cumulative value SPB of the code amount about the P picture and the B picture to the cumulative value SI of the code amount about the I picture as the code amount ratio (step S108). The code amount ratio calculating unit 14 deems the code amount ratio that has been calculated about the immediately-previous period and has been stored in the memory 11 as the code amount ratio of the previous period and deems the code amount ratio calculated in the step S108 as the code amount ratio of the present period to store the code amount ratio of the present period in the memory 11. The code amount ratio calculating unit 14 ends the code amount ratio calculation processing.

The rate control unit 15 sets the frame rate and the bit rate at each given cycle based on the transition of the code amount ratio and the transition of the frame rate.

FIG. 5 illustrates one example of a table that represents a relationship between a transition of a code amount ratio and a transition of a frame rate and a change tendency of a difficulty level of coding estimated about an application period of a next set values of a frame rate and a bit rate. In a table 500 illustrated in FIG. 5, symbols A to C represent the change tendency of the difficulty level of coding. In this example, symbol A represents that the difficulty level becomes higher in the next period than in the present period and symbol B represents that the difficulty level does not change from the present period in the next period. Symbol C represents that the difficulty level becomes lower in the next period than in the present period.

Each row of the table 500 represents the change tendency of the difficulty level estimated about the next period with respect to the transition of the code amount ratio. The uppermost row represents the change tendency of the difficulty level when the code amount ratio of the present period is lower than the code amount ratio of the previous period, for example, when the accuracy of the motion prediction becomes higher or the scene becomes easier. The second row represents the change tendency of the difficulty level when the code amount ratio of the previous period and the code amount ratio of the present period are substantially equal, for example, when the accuracy of the motion prediction and the complexity of the scene do not change. The lowermost row represents the change tendency of the difficulty level when the code amount ratio of the present period is higher than the code amount ratio of the previous period, for example, when the accuracy of the motion prediction becomes lower or the scene becomes more complicated.

In the table 500, each column represents the change tendency of the difficulty level estimated about the next period with respect to the transition of the frame rate. For example, the leftmost column corresponds to the case in which the frame rate corresponding to the allowable bit rate according to the transmission bandwidth regarding the present period (hereinafter, referred to as setting frame rate) is lower than the frame rate of the present period. The setting frame rate corresponding to the allowable bit rate is obtained by referring to the rate reference table. In this case, the difference between the bit rate envisaged according to the frame rate and the bit rate of each picture actually coded has a tendency to become larger. The central column corresponds to the case in which the frame rate of the present period and the setting frame rate are the same. In this case, the difference between the bit rate envisaged according to the frame rate and the bit rate of each picture actually coded has a tendency to be equivalent also in the next period. The rightmost column corresponds to the case in which the setting frame rate is higher than the frame rate of the present period. In this case, the difference between the bit rate envisaged according to the frame rate and the bit rate of each picture actually coded has a tendency to become smaller.

As described above, it is envisaged that the difficulty level of coding of the picture is higher when the code amount ratio is higher. Therefore, as represented in the table 500, if the code amount ratio in the present period is high compared with the code amount ratio in the previous period, it is estimated that the difficulty level of coding is higher in the pictures included in the present period than in the pictures included in the previous period. Accordingly, irrespective of the transition of the frame rate, it is estimated that the difficulty level of coding of the pictures included in the period next to the present period has a tendency to become higher. Conversely, if the code amount ratio in the present period is low or equivalent compared with the code amount ratio in the previous period, the change tendency of the difficulty level is estimated according to the transition of the frame rate. For example, in this case, if the setting frame rate based on the transmission bandwidth is lower than the frame rate set about the present period, it is estimated that the difficulty level has a tendency to become higher. If the frame rate set about the present period and the setting frame rate based on the transmission bandwidth are the same, it is estimated that the difficulty level tends not to change. If the setting frame rate based on the transmission bandwidth is higher than the frame rate set about the present period, it is estimated that the difficulty level has a tendency to become lower.

The rate control unit 15 lowers the set value of the frame rate regarding the next period if the change tendency of the difficulty level of coding estimated about the next period is A or B, for example, if it is estimated that the difficulty level of coding becomes higher or is a difficulty level equivalent to the difficulty level of the present period. On the other hand, the rate control unit 15 sets the set value of the bit rate higher regarding the next period if the change tendency of the difficulty level of coding estimated about the next period is C or B, for example, if it is estimated that the difficulty level of coding becomes lower or is a difficulty level equivalent to the difficulty level of the present period.

Figure 6:
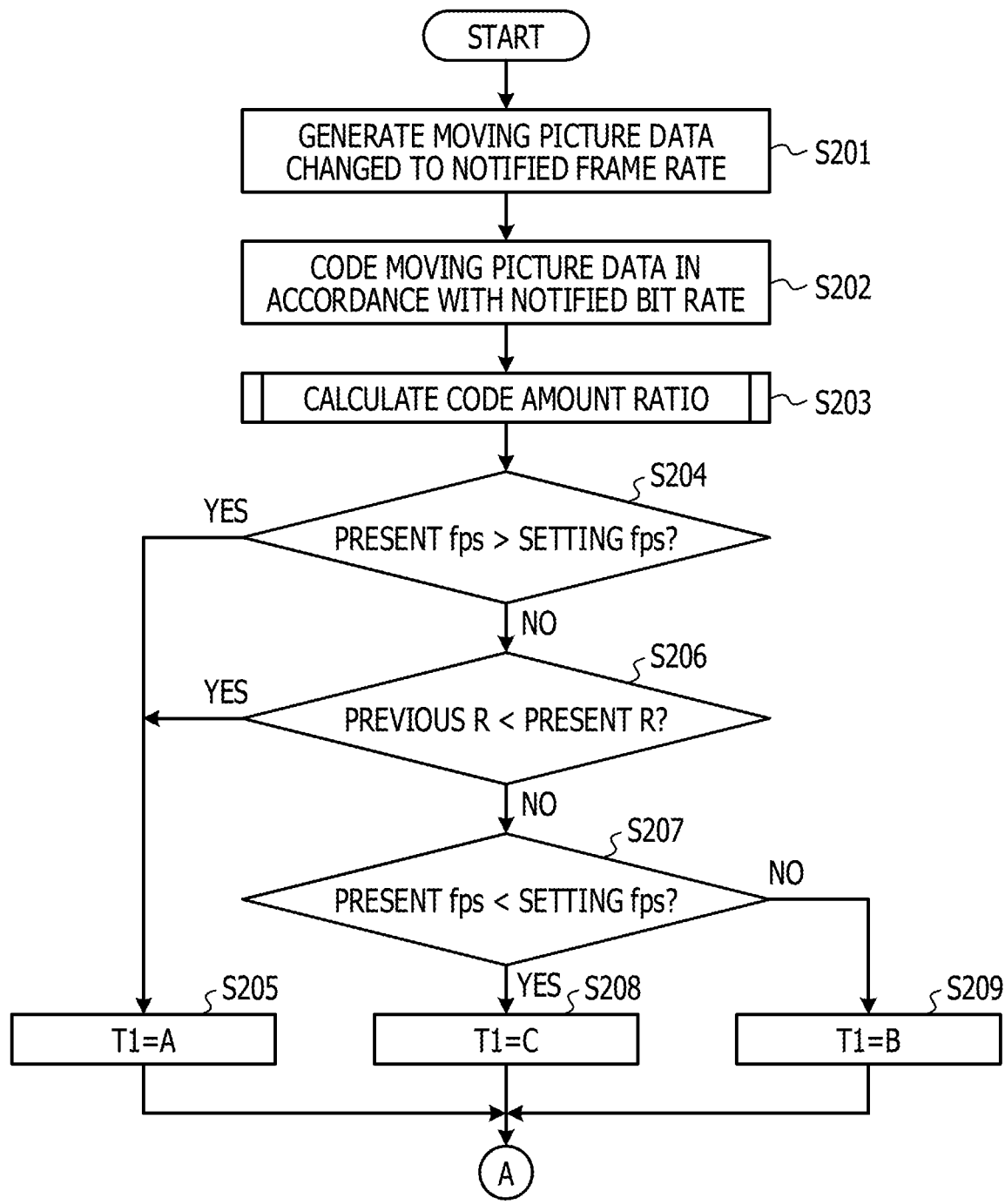
FIG. 6 illustrates one example of moving picture coding processing including rate control processing.
Figure 7:
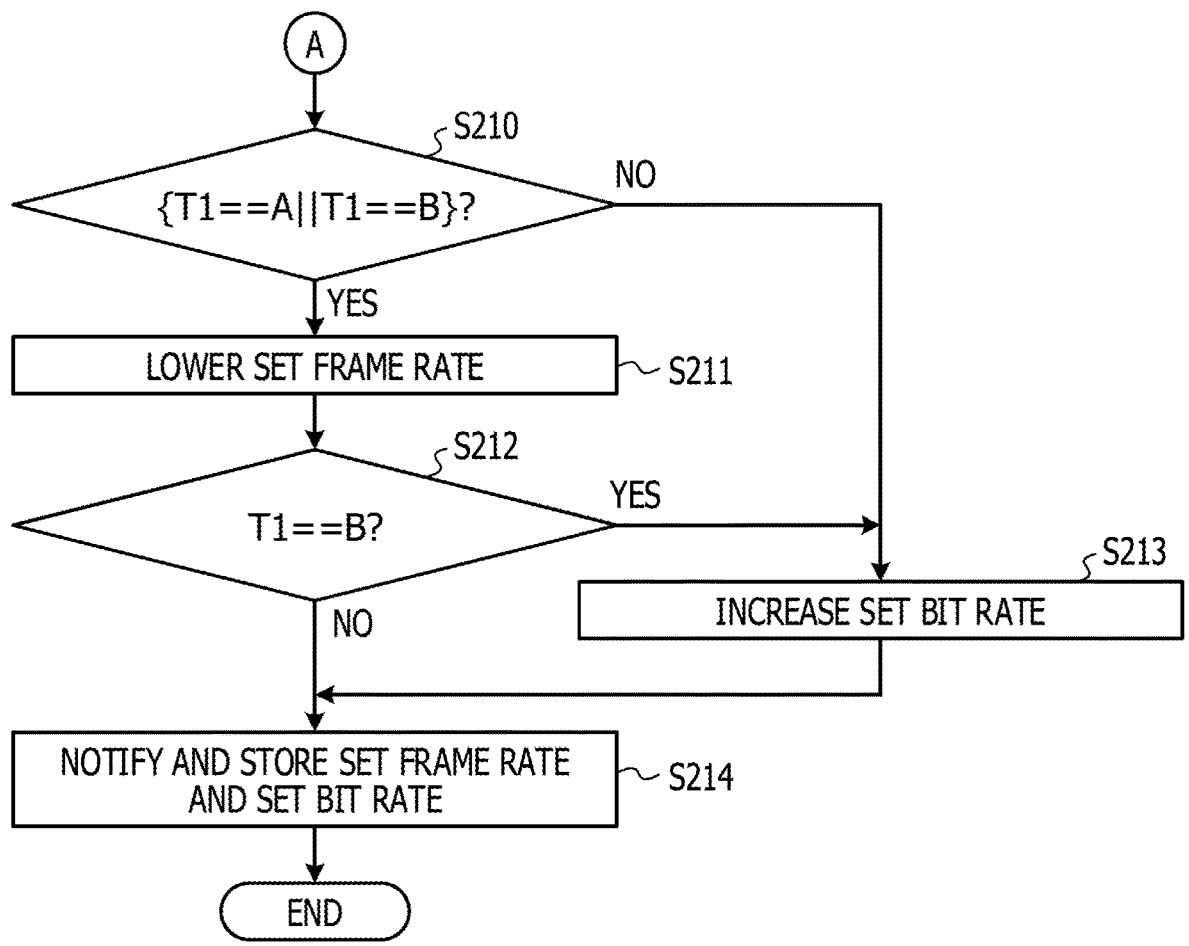
FIG. 7 illustrates one example of moving picture coding processing including rate control processing.

FIG. 6 and FIG. 7 are an operation flowchart of moving picture coding processing that is executed by a moving picture coding apparatus and includes rate control processing. The moving picture coding apparatus illustrated by reference to FIG. 6 and FIG. 7 may be the moving picture coding apparatus 1 depicted in FIG. 1. The moving picture coding apparatus 1 executes the moving picture coding processing in each period corresponding to the given cycle in accordance with the operation flowchart represented below. In the operation flowchart represented below, steps S203 to S214 correspond to the rate control processing.

The frame rate change unit 12 changes the frame rate of original moving picture data to a frame rate notified from the rate control unit 15 in the previous period (step S201). The frame rate change unit 12 outputs each picture of moving picture data with the changed frame rate to the coding unit 13.

The coding unit 13 codes each picture of the moving picture data received from the frame rate change unit 12 in accordance with a bit rate notified from the rate control unit 15 in the previous period (step S202). The coding unit 13 outputs coded data of each picture to a buffer (not illustrated).

The code amount ratio calculating unit 14 refers to the coded data of each picture and calculates the code amount ratio (step S203).

The rate control unit 15 determines whether or not the frame rate of the present period (present fps) is higher than the setting frame rate (setting fps) based on the transmission bandwidth (step S204). If the present fps is higher than the setting fps (step S204-Yes), the rate control unit 15 estimates a tendency T1 of the difficulty level of coding about the next period as A (for example, the difficulty level becomes higher) (step S205).

On the other hand, if the present fps is equal to or lower than the setting fps (step S204-No), the rate control unit 15 determines whether or not the code amount ratio of the previous period (previous R) is lower than the code amount ratio of the present period (present R) (step S206). If the code amount ratio of the previous period is lower than the code amount ratio of the present period (step S206-Yes), the rate control unit 15 estimates the tendency T1 of the difficulty level of coding about the next period as A (step S205).

On the other hand, if the code amount ratio of the previous period is equal to or higher than the code amount ratio of the present period (step S206-No), the rate control unit 15 determines whether or not the present fps is lower than the setting fps (step S207). If the present fps is lower than the setting fps (step S207-Yes), the rate control unit 15 estimates the tendency T1 of the difficulty level of coding about the next period as C (for example, the difficulty level becomes lower) (step S208). On the other hand, if the present fps and the setting fps are the same (step S207-No), the rate control unit 15 estimates the tendency T1 of the difficulty level of coding about the next period as B (for example, the difficulty level does not change) (step S209).

As illustrated in FIG. 7, after the step S205, S208, or S209, the rate control unit 15 determines whether or not the estimated tendency T1 of the difficulty level is A or B (step S210). If the estimated tendency T1 of the difficulty level is A or B (step S210-Yes), the rate control unit 15 sets the frame rate in such a manner that the frame rate of the next period is set lower than the frame rate of the present period (step S211). For example, the rate control unit 15 obtains the bit rate set about the next period in accordance with the following expression. The rate control unit 15 refers to the rate reference table to identify the frame rate corresponding to the set bit rate and employ the identified frame rate as the set value of the frame rate about the next period.

[Expression 1]

$$\text{Next-period set bit rate} = bsc - (bmc - bsc)/fc \quad (1)$$

bsc: present-period set bit rate
bmc: bit rate according to the code amount of the present period
fc: set frame rate of the present period After the step S211, the rate control unit 15 determines whether or not the estimated tendency T1 of the difficulty level is B (step S212). If the estimated tendency T1 of the difficulty level is B (step S212-Yes), the rate control unit 15 increases the bit rate set about the next period (step S213). Also when the estimated tendency T1 of the difficulty level is C in the step S210 (step S210-No), the rate control unit 15 executes the processing of the step S213. For example, the rate control unit 15 sets the bit rate about the next period in accordance with the following expression.

[Expression 2]

$$\text{Next-period set bit rate} = bsc + (bmc - bsc)/2 \quad (2)$$

bsc: present-period set bit rate
bmc: bit rate according to the code amount of the present period If the estimated tendency T1 of the difficulty level is A in the step S212 (step S212-No) or after the step S213, the rate control unit 15 stores the set frame rate and bit rate in the memory 11. Moreover, the rate control unit 15 notifies the set frame rate to the frame rate change unit 12 and notifies the set bit rate to the coding unit 13 (step S214). The moving picture coding apparatus 1 ends the moving picture coding processing.

Until the code amount ratio is calculated regarding two periods, the rate control unit 15 may employ the allowable bit rate corresponding to the transmission bandwidth as the set bit rate and set the frame rate corresponding to the allowable bit rate through reference to the rate reference table. According to a modification example, the rate control unit 15 may keep the frame rate and the bit rate without change if the estimated tendency T1 of the difficulty level is B. In order for the frame rate or the bit rate not to suddenly change, if (bmc−bsc) surpasses a given upper limit value, the rate control unit 15 may obtain the bit rate set about the next period by using the upper limit value instead of (bmc−bsc) in expression (1) or expression (2).

According to another modification example, if the estimated tendency T1 of the difficulty level is A or B, the rate control unit 15 may lower the frame rate from the frame rate set about the present period by a given rate specified in advance. In this case, contrary to the above-described embodiment, the rate control unit 15 may identify the bit rate corresponding to the frame rate after the lowering with reference to the rate reference table and employ the identified bit rate as the set value of the bit rate about the next period.

Alternatively, if the estimated tendency T1 of the difficulty level is B or C, the rate control unit 15 may calculate the absolute value of the difference between the actual bit rate about the present period and the bit rate set about the present period. The rate control unit 15 may set the value obtained by adding the bit rate set about the present period to the absolute value of the difference as the bit rate about the next period.

Even when the estimated tendency T1 of the difficulty level is B or C, the rate control unit 15 may keep the bit rate about the present period as the bit rate about the next period if the difference between the bit rate set about the present period and the allowable bit rate is equal to or smaller than a given threshold. Due to this, the occurrence of underflow in moving picture decoding apparatus is suppressed.

The rate control unit 15 does not have to change the frame rate and the bit rate about the next period if the absolute value of the difference between the bit rate corresponding to the actual code amount about the present period and the bit rate set about the present period falls within a given allowable range. As the given allowable range, a range of ±1% to 2% with respect to the bit rate set about the present period may be employed, for example.

As described above, this moving picture coding apparatus estimates the change tendency of the difficulty level of coding at the present timing and the subsequent timings based on the transition of the ratio of the code amount of each picture type and the transition of the set frame rate. This moving picture coding apparatus lowers the frame rate if it is estimated that the difficulty level becomes higher, whereas the moving picture coding apparatus increases the bit rate if it is estimated that the difficulty level becomes lower. This allows this moving picture coding apparatus to properly control the frame rate and the bit rate even if it is difficult to check the scene of each picture of moving picture data as the coding target and to adjust parameters for bit rate control. Moreover, a certain degree of time lag often exists from notification of change in the set values of the frame rate and the bit rate to the coding unit to actual reflection of the change. However, even in such a case, this moving picture coding apparatus may suppress increase in the difference between the bit rate corresponding to the actual code amount and the set bit rate because controlling the frame rate and the bit rate based on the estimated change tendency of the difficulty level of coding at the present timing and the subsequent timings.

Regarding the communication path through which coded moving picture data is transmitted, the transmission bandwidth usable for the transmission of the moving picture data often varies. For example, the usable transmission bandwidth decreases when data that is transmitted from another piece of equipment coupled to the communication path and is other than coded moving picture data increases, for example, when traffic increases. Thus, the moving picture coding apparatus may estimate the change tendency of the difficulty level of coding, and besides, the tendency of variation in the usable transmission bandwidth and set the frame rate and the bit rate based on the estimation result.

Figure 8:
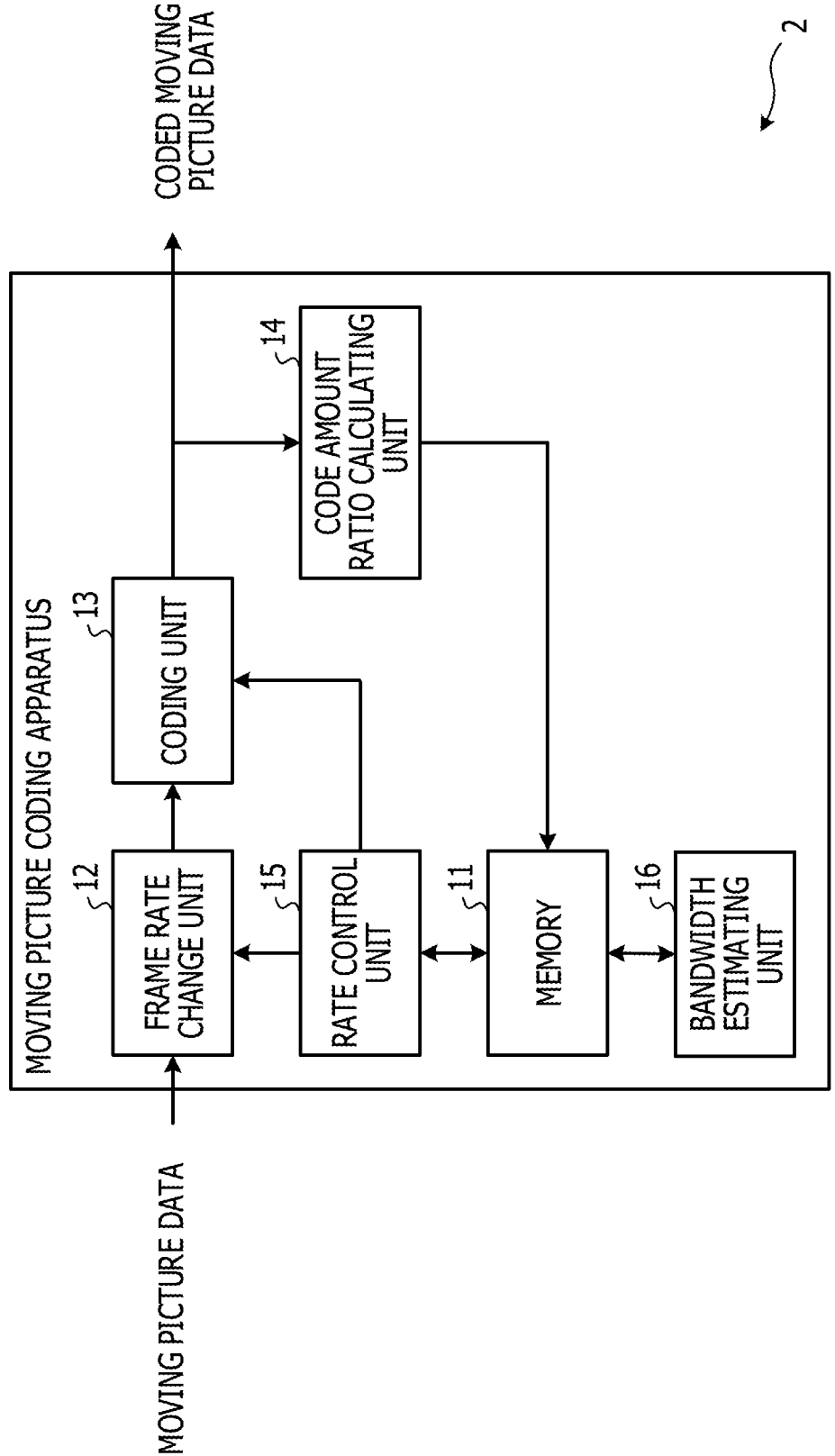
FIG. 8 illustrates one example of a moving picture coding apparatus.

FIG. 8 illustrates one example of a moving picture coding apparatus. A moving picture coding apparatus 2 includes the memory 11, the frame rate change unit 12, the coding unit 13, the code amount ratio calculating unit 14, the rate control unit 15, and a bandwidth estimating unit 16. These respective units which the moving picture coding apparatus 2 includes are each implemented in the moving picture coding apparatus 2 as a separate circuit. Alternatively, these respective units which the moving picture coding apparatus 2 includes may be implemented in the moving picture coding apparatus 2 as one or plural integrated circuits into which circuits that implement functions of the respective units are integrated. Alternatively, these respective units which the moving picture coding apparatus 2 includes may be function modules implemented by a computer program executed on a processor which the moving picture coding apparatus 2 includes.

The moving picture coding apparatus 2 according to a second embodiment is different in that the moving picture coding apparatus 2 includes the bandwidth estimating unit 16 and in processing of the rate control unit 15 compared with the moving picture coding apparatus 1 according to the first embodiment. Thus, in the following, description will be made about the bandwidth estimating unit 16 and the rate control unit 15. As for the other respective units of the moving picture coding apparatus 2, refer to the description of the corresponding constituent elements of the moving picture coding apparatus 1.

The bandwidth estimating unit 16 estimates the usable transmission bandwidth about the communication path to which coded moving picture data is transmitted at each given cycle.

For example, the bandwidth estimating unit 16 measures the delay amount between the moving picture coding apparatus 2 and a moving picture decoding apparatus (not illustrated), the error rate, the number of times of retransmission, and so forth in each given period. The bandwidth estimating unit 16 refers to a bandwidth reference table that represents the relationship between the delay amount, the error rate, or the number of times of retransmission and the transmission bandwidth and identifies the transmission bandwidth corresponding to these measurement values. The bandwidth estimating unit 16 estimates the identified transmission bandwidth as the usable transmission bandwidth in the period. The cycle of the estimation of the transmission bandwidth by the bandwidth estimating unit 16 and the cycle at which control of the frame rate and the bit rate is carried out may be the same or may be different. The bandwidth estimating unit 16 stores the estimated usable transmission bandwidth in the memory 11.

The rate control unit 15 obtains the set value of the frame rate and the set value of the bit rate that are applied in the next period according to the increase-decrease tendency of the usable transmission bandwidth and the change tendency of the difficulty level of coding.

FIG. 9 illustrates one example of a table that represents a relationship between a transition of an allowable bit rate and variation in a transmission bandwidth estimated about a next period. In a table 900 represented in FIG. 9, symbols A to C represent the increase-decrease tendency of the transmission bandwidth. In this example, symbol A represents that the transmission bandwidth becomes narrower. Symbol B represents that the transmission bandwidth does not change. Symbol C represents that the transmission bandwidth becomes broader.

Each row of the table 900 represents the increase-decrease tendency of the transmission bandwidth estimated about the next period with respect to the transition of the allowable bit rate. For example, the uppermost row represents that it is estimated that the transmission bandwidth has a tendency to become narrower if the allowable bit rate of the present period is lower than the allowable bit rate of the previous period. The second row represents that it is estimated that the transmission bandwidth does not change if the allowable bit rate of the previous period and the allowable bit rate of the present period are substantially equal. The lowermost row represents that it is estimated that the transmission bandwidth has a tendency to become broader if the allowable bit rate of the present period is higher than the allowable bit rate of the previous period.

The rate control unit 15 determines whether or not to increase the bit rate and whether or not to lower the frame rate according to the difficulty level of coding, and besides, the increase-decrease tendency of the transmission bandwidth. For example, even when the difficulty level of coding becomes higher or does not change (difficulty level A or B in FIG. 5), the rate control unit 15 does not lower the frame rate if it is estimated that the transmission bandwidth has a tendency to become broader (increase-decrease tendency C in FIG. 9). This is because it is envisaged that, without lowering of the frame rate by the rate control unit 15, the occurrence of underflow in moving picture decoding apparatus is suppressed due to increase in the allowable bit rate in association with increase in the transmission bandwidth. Because the frame rate is kept, the deterioration of the picture quality of decoded moving picture data is suppressed.

Even when the difficulty level of coding becomes lower or does not change (difficulty level C or B in FIG. 5), the rate control unit 15 does not increase the bit rate if it is estimated that the transmission bandwidth has a tendency to become narrower (increase-decrease tendency A in FIG. 9). This is because, when the rate control unit 15 increases the bit rate, there is a possibility that the allowable bit rate lowers in association with decrease in the transmission bandwidth and the bit rate according to the amount of codes actually output from the coding unit 13 surpasses the allowable bit rate.

Regarding factors other than the above-described combination of the difficulty level of coding and the increase-decrease tendency of the transmission bandwidth, the rate control unit 15 may control the frame rate or the bit rate in accordance with the change tendency of the difficulty level similarly to the first embodiment.

Figure 10:
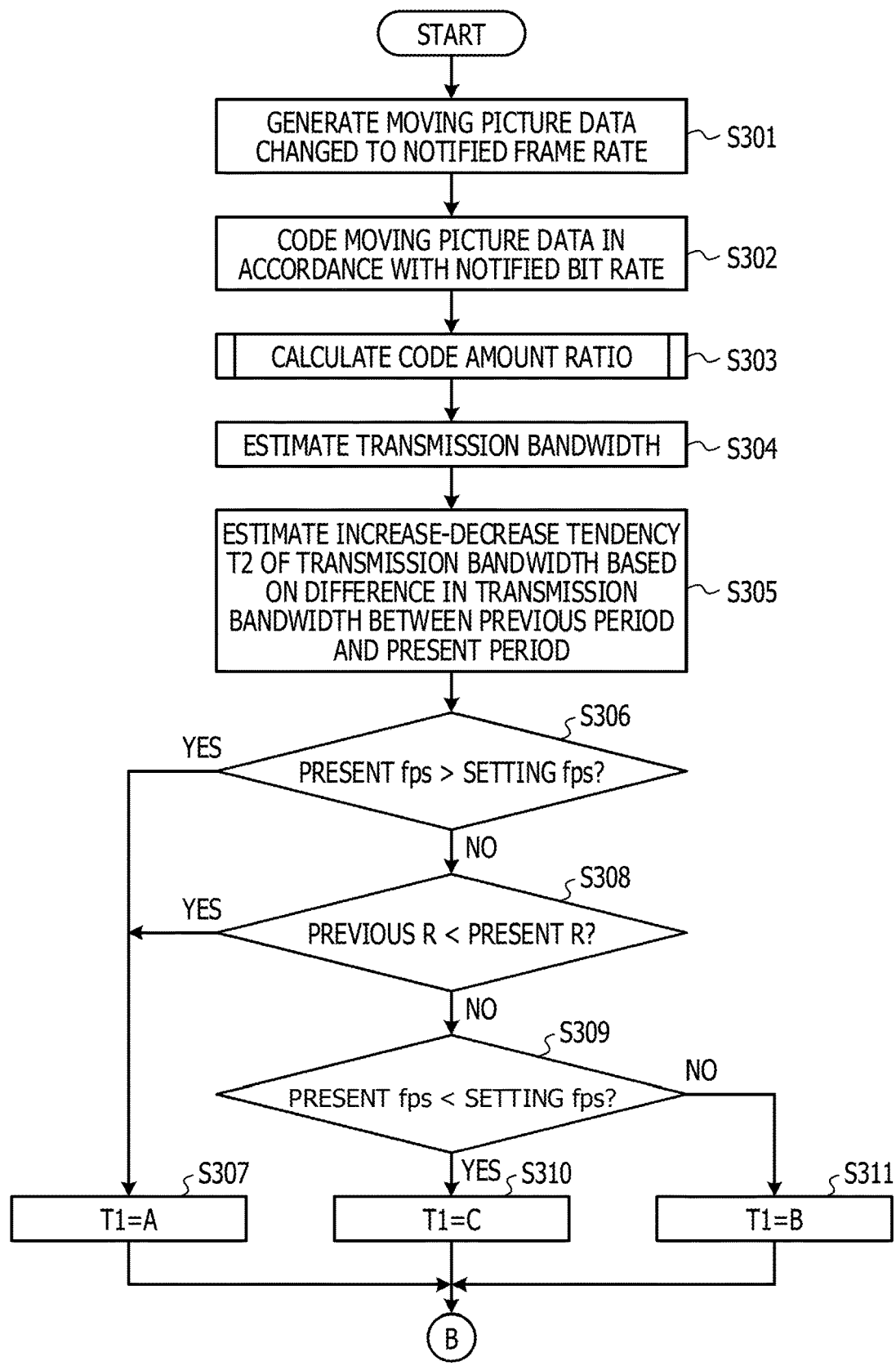
FIG. 10 illustrates one example of moving picture coding processing including rate control processing.
Figure 11:
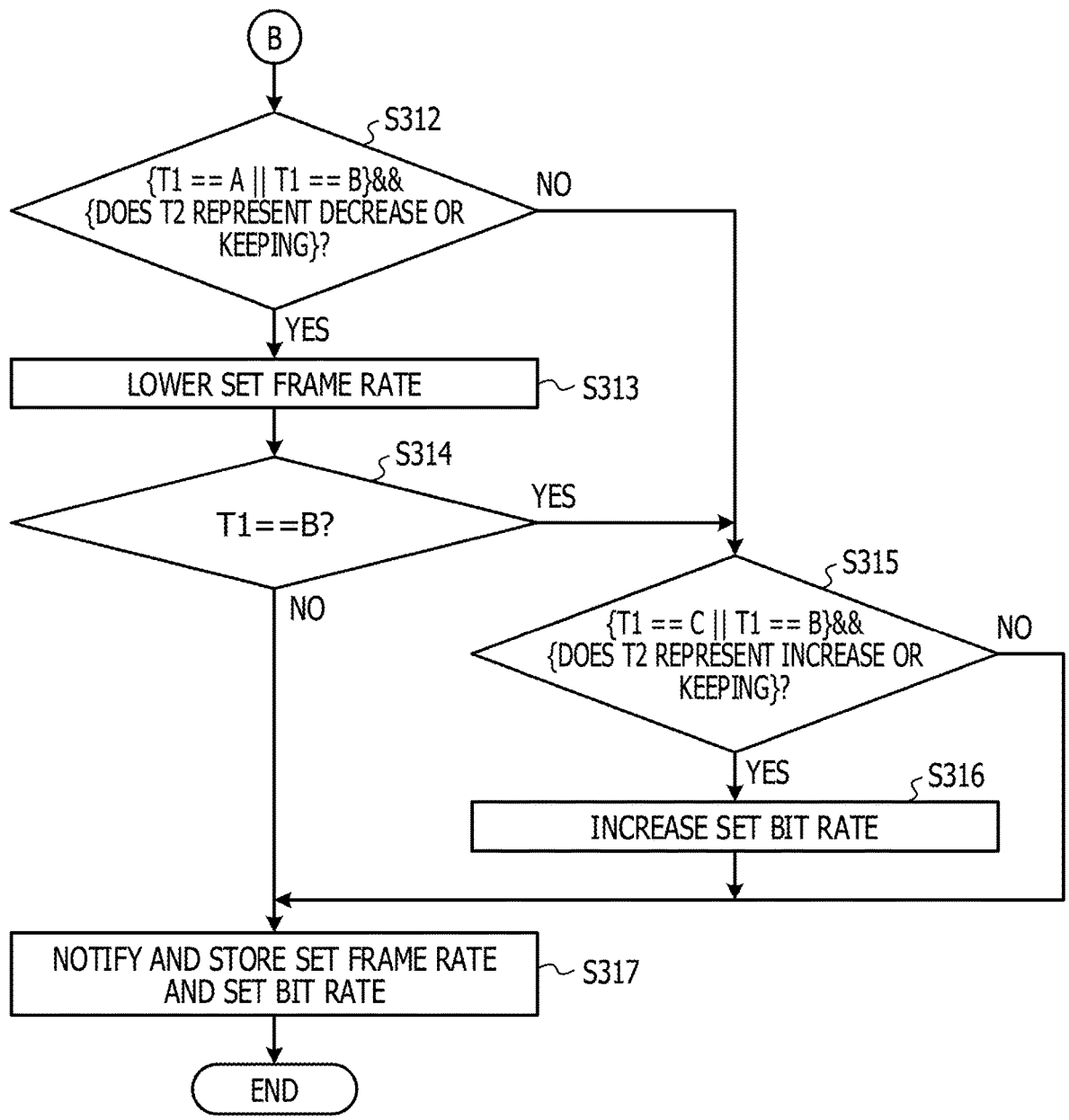
FIG. 11 illustrates one example of moving picture coding processing including rate control processing.

FIG. 10 and FIG. 11 are an operation flowchart of moving picture coding processing that is executed by a moving picture coding apparatus and includes rate control processing. The moving picture coding apparatus illustrated by reference to FIG. 10 and FIG. 11 may be the moving picture coding apparatus 2 depicted in FIG. 8. The moving picture coding apparatus 2 executes the moving picture coding processing in each given period in accordance with the operation flowchart represented below. Steps S303 to S317 correspond to the rate control processing.

The frame rate change unit 12 changes the frame rate of original moving picture data to a frame rate notified from the rate control unit 15 in the previous period (step S301). The frame rate change unit 12 outputs each picture of moving picture data with the changed frame rate to the coding unit 13.

The coding unit 13 codes each picture of the moving picture data received from the frame rate change unit 12 in accordance with a bit rate notified from the rate control unit 15 in the previous period (step S302). The coding unit 13 outputs coded data of each picture to a buffer (not illustrated).

The code amount ratio calculating unit 14 refers to the coded data of each picture and calculates the code amount ratio (step S303).

The bandwidth estimating unit 16 estimates the usable transmission bandwidth about the communication path to which coded moving picture data is transmitted (step S304). The rate control unit 15 estimates an increase-decrease tendency T2 of the transmission bandwidth based on the difference between the transmission bandwidth in the present period and the transmission bandwidth in the previous period (step S305).

The rate control unit 15 determines whether or not the frame rate of the present period (present fps) is higher than the setting frame rate (setting fps) based on the transmission bandwidth estimated about the present period (step S306). If the present fps is higher than the setting fps (step S306-Yes), the rate control unit 15 estimates the change tendency T1 of the difficulty level of coding about the next period as A (for example, the difficulty level becomes higher) (step S307).

On the other hand, if the present fps is equal to or lower than the setting fps (step S306-No), the rate control unit 15 determines whether or not the code amount ratio of the previous period (previous R) is lower than the code amount ratio of the present period (present R) (step S308). If the code amount ratio of the previous period is lower than the code amount ratio of the present period (step S308-Yes), the rate control unit 15 estimates the change tendency T1 of the difficulty level of coding about the next period as A (step S307).

On the other hand, if the code amount ratio of the previous period is equal to or higher than the code amount ratio of the present period (step S308-No), the rate control unit 15 determines whether or not the present fps is lower than the setting fps (step S309). If the present fps is lower than the setting fps (step S309-Yes), the rate control unit 15 estimates the change tendency T1 of the difficulty level of coding about the next period as C (for example, the difficulty level becomes lower) (step S310). On the other hand, if the present fps and the setting fps are the same (step S309-No), the rate control unit 15 estimates the change tendency T1 of the difficulty level of coding about the next period as B (for example, the difficulty level does not change) (step S311).

As illustrated in FIG. 11, after the step S307, S310, or S311, the rate control unit 15 determines whether or not the estimated change tendency T1 of the difficulty level is A or B and the increase-decrease tendency T2 represents decrease or keeping (step S312). If the estimated change tendency T1 of the difficulty level is A or B and the increase-decrease tendency T2 represents decrease or keeping (step S312-Yes), the rate control unit 15 sets the frame rate in such a manner that the frame rate of the next period is set lower than the frame rate of the present period (step S313). For example, the rate control unit 15 sets the bit rate set about the next period in accordance with expression (1). The rate control unit 15 refers to the rate reference table to identify the frame rate corresponding to the set bit rate and employ the identified frame rate as the frame rate about the next period.

After the step S313, the rate control unit 15 determines whether or not the estimated change tendency T1 of the difficulty level is B (step S314). If the estimated change tendency T1 of the difficulty level is B (step S314-Yes), the rate control unit 15 determines whether or not the estimated change tendency T1 of the difficulty level is C or B and the increase-decrease tendency T2 represents increase or keeping (step S315). Also when the estimated change tendency T1 of the difficulty level is C or the increase-decrease tendency T2 is an increase tendency in the step S312, the rate control unit 15 executes the processing of the step S315.

If the estimated change tendency T1 of the difficulty level is C or B and the increase-decrease tendency T2 represents increase or keeping (step S315-Yes), the rate control unit 15 increases the bit rate set about the next period (step S316). For example, the rate control unit 15 sets the bit rate about the next period in accordance with expression (2).

If the estimated change tendency T1 of the difficulty level is A in the step S314 (step S314-No) or after the step S316, the rate control unit 15 stores the set frame rate and bit rate in the memory 11. Also when the estimated change tendency T1 of the difficulty level is A or the increase-decrease tendency T2 is a decrease tendency in the step S315, the rate control unit 15 stores the set frame rate and bit rate in the memory 11. Moreover, the rate control unit 15 notifies the set frame rate to the frame rate change unit 12 and notifies the set bit rate to the coding unit 13 (step S317). The moving picture coding apparatus 2 ends the moving picture coding processing.

Also in the second embodiment, the rate control unit 15 may keep the frame rate and the bit rate without change if the estimated change tendency T1 of the difficulty level is B.

According to the second embodiment, the moving picture coding apparatus estimates the increase-decrease tendency of the usable transmission bandwidth about the communication path to which coded moving picture data is transmitted and controls the frame rate and the bit rate according to not only the difficulty level of coding and the increase-decrease tendency. For this reason, this moving picture coding apparatus may set the frame rate and the bit rate more properly. Moreover, this moving picture coding apparatus predicts the increase-decrease tendency of the usable transmission bandwidth about the communication path and controls the frame rate and the bit rate before the transmission bandwidth actually changes. For this reason, this moving picture coding apparatus may reduce the time lag from the change in the transmission bandwidth to the changing of the frame rate and the bit rate.

According to a modification example of the second embodiment, the rate control unit 15 does not have to use the transmission bandwidth of the communication path estimated by the bandwidth estimating unit 16 for prediction of the increase-decrease tendency of the transmission bandwidth. In this case, it suffices for the estimated transmission bandwidth of the communication path to be used for derivation of the setting frame rate based on the transmission bandwidth when the change tendency of the difficulty level is estimated. In this case, in the operation flowchart represented in FIG. 10 and FIG. 11, the processing of the step S305 may be omitted. Moreover, the rate control unit 15 may execute the processing of the steps S210 to S214 represented in FIG. 7 instead of the processing of the steps S312 to S317.

In the above-described embodiment or modification example, the rate control unit 15 may estimate the change tendency of the difficulty level of coding regarding the next period based on the code amount ratio of three or more periods. In this case, the rate control unit 15 may obtain a first-order or second- or higher-order polynomial that represents the increase-decrease tendency of the code amount ratio by applying the least squares method to the code amount ratio of three or more periods, for example. The rate control unit 15 may determine whether the code amount ratio in the next period has an increase tendency or a decrease tendency in accordance with the polynomial. The rate control unit 15 may refer to the increase-decrease tendency of the code amount ratio instead of the magnitude relationship between the code amount ratio of the previous period and the code amount ratio of the present period in the table represented in FIG. 5 to estimate the change tendency of the difficulty level of coding. For example, if the code amount ratio has an increase tendency, the rate control unit 15 may estimate the change tendency of the difficulty level of coding as A irrespective of the magnitude relationship between the frame rate of the previous period and the frame rate of the present period. If the code amount ratio has a decrease tendency, the rate control unit 15 may estimate the change tendency of the difficulty level of coding according to the magnitude relationship between the frame rate of the previous period and the frame rate of the present period as represented on the uppermost row of the table represented in FIG. 5.

Similarly, the rate control unit 15 may estimate the increase-decrease tendency of the usable transmission bandwidth based on the usable transmission bandwidth of three or more periods. Also in this case, the rate control unit 15 may obtain a first-order or second- or higher-order polynomial that represents the increase-decrease tendency of the transmission bandwidth by applying the least squares method to the transmission bandwidth of three or more periods, for example. The rate control unit 15 may determine whether the transmission bandwidth in the next period has an increase tendency or a decrease tendency in accordance with the polynomial.

The moving picture coding apparatus according to the above-described embodiment or modification example thereof is used for various purposes. For example, this moving picture coding apparatus is incorporated into video transmitting apparatus, television telephone system, virtual desktop system, computer, mobile phone, or the like.

Figure 12:
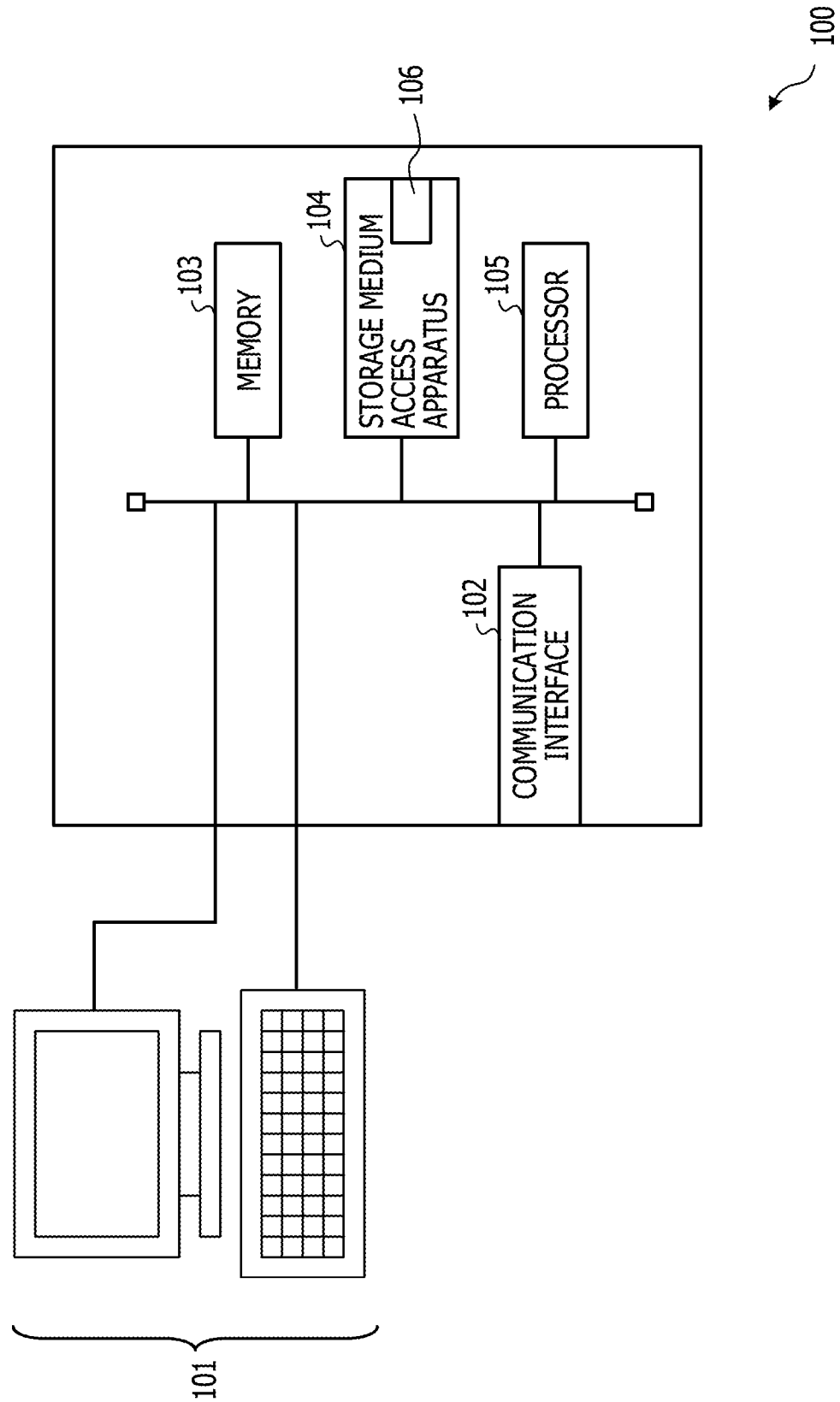
FIG. 12 illustrates one example of a computer.

FIG. 12 is a configuration diagram of a computer that operates as a moving picture coding apparatus through operation of a computer program that implements functions of respective units of the moving picture coding apparatus according to the above-described embodiment or modification example thereof.

A computer 100 includes a user interface 101, a communication interface 102, a memory 103, a storage medium access apparatus 104, and a processor 105. The processor 105 is coupled to the user interface 101, the communication interface 102, the memory 103, and the storage medium access apparatus 104 via a bus, for example.

The user interface 101 includes an input apparatus such as keyboard and mouse and display apparatus such as a liquid crystal display. Alternatively, the user interface 101 may include an apparatus obtained by an integrating input apparatus and a display apparatus, such as a touch panel display. The user interface 101 outputs an operation signal to select moving picture data to be coded to the processor 105 in response to operation by a user, for example.

The communication interface 102 may include a communication interface for coupling the computer 100 to an apparatus that generates moving picture data, for example, a video camera, and a control circuit thereof. For such a communication interface, the universal serial bus (USB) may be employed, for example.

Moreover, the communication interface 102 may include a communication interface for coupling to a communication network compliant with a communication standard such as the Ethernet (registered trademark) and a control circuit thereof.

In this case, the communication interface 102 acquires moving picture data to be coded from another piece of equipment coupled to the communication network and transfers these pieces of data to the processor 105. The communication interface 102 may output coded moving picture data received from the processor 105 to another piece of equipment via the communication network. In this case, the processor 105 may execute the moving picture coding processing according to the above-described embodiment or modification example according to the transmission bandwidth of the communication network.

The memory 103 is one example of a storing unit and includes a semiconductor memory capable of reading and writing and a semiconductor memory exclusively for reading, for example. The memory 103 stores a computer program that is executed on the processor 105 and is for executing the moving picture coding processing and the rate control processing and data generated in the middle of or as the result of these kinds of processing.

The storage medium access apparatus 104 is apparatus that accesses a storage medium 106 such as magnetic disc, semiconductor memory card, and optical storage medium. The storage medium access apparatus 104 reads the computer program for the moving picture coding processing and the rate control processing, stored in the storage medium 106 and executed on the processor 105, and transfers the computer program to the processor 105, for example.

The processor 105 includes one or more central processing units (CPUs). The processor 105 may further include a numerical processor. The processor 105 generates coded moving picture data by executing the computer program for the moving picture coding processing according to the above-described embodiment or modification example for input moving picture data. The processor 105 saves the generated coded moving picture data in the memory 103 or outputs the coded moving picture data to another piece of equipment through the communication interface 102.

The computer program that may execute functions of the respective units of the moving picture coding apparatus 1 on a processor may be provided in the form of being recorded on a medium readable by a computer. However, carrier waves are not included in such a recording medium.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. An information processing apparatus comprising:
a memory; and
a processor coupled to the memory and configured to:
change a frame rate in a given period of moving picture data to a first set value of the frame rate;
code respective pictures, which are included in the given period in which the frame rate is changed and are multiple kinds of pictures including at least a first kind of picture, a second kind of picture and a third kind of picture in which coding methods of the first kind of picture, the second kind of picture and the third kind of picture are different with each other, in such a manner that a code amount according to the first set value is obtained;
calculate a cumulative value of a code amount of each of the first kind of picture, the second kind of picture and the third kind of picture;
calculate a first ratio of the cumulative value of the code amount of the second kind of picture to the cumulative value of the code amount of the first kind of picture or a second ratio of the cumulative value of the code amount of the third kind of picture to the cumulative value of the code amount of the first kind of picture;

estimate a change tendency of a difficulty level of coding of respective pictures included in a next period after the given period based on transition of the frame rate and transition of the first ratio or the second ratio; and obtain a second set value of the frame rate and a third set value of a bit rate that are applied to the next period according to the change tendency of the difficulty level.

2. The information processing apparatus according to claim 1, wherein the processor lowers the second set value compared with the first set value when estimating that the difficulty level in the next period becomes higher than the difficulty level in the given period.

3. The information processing apparatus according to claim 1, wherein the processor increases the second set value compared with the first set value when estimating that the difficulty level in the next period becomes lower than the difficulty level in the given period.

4. The information processing apparatus according to claim 3, wherein the processor sets a fourth set value of the bit rate applied to the next period to the third set value when a difference between an allowable bit rate corresponding to transmission bandwidth of a communication path to which the coded moving picture data is transmitted and the third set value is smaller than a given value.

5. The information processing apparatus according to claim 1, wherein the processor is configured to:

estimate transmission bandwidth usable for transmission of the coded moving picture data, regarding a communication path to which the coded moving picture data is transmitted; and obtain the second set value of the frame rate and a fourth set value of the bit rate that are applied to the next period according to an increase-decrease tendency of the estimated transmission bandwidth and the estimated change tendency of the difficulty level.

6. The information processing apparatus according to claim 5, wherein the processor lowers the second set value compared with the first set value when estimating that the difficulty level in the next period becomes higher than the difficulty level in the given period and the transmission bandwidth in the next period becomes equal to or smaller than the transmission bandwidth in the given period.

7. The information processing apparatus according to claim 5, wherein the processor increases the fourth set value compared with the third set value when estimating that the difficulty level in the next period becomes lower than the difficulty level in the given period and the transmission bandwidth in the next period becomes equal to or larger than the transmission bandwidth in the given period.

8. The information processing apparatus according to claim 2, further comprising: a table that represents a correspondence relationship between the bit rate and the frame rate, wherein the processor is configured to:

identify, with reference to the table, a value of the frame rate corresponding to a value obtained by subtracting, from the third set value, a value obtained by dividing a difference between the third set value and a bit rate corresponding to the code amount of the respective pictures in the given period by the first set value; and employ the identified value of the frame rate as the second set value.

9. The information processing apparatus according to claim 1, wherein the second kind of picture and the third kind of picture are coded with reference to another picture and the first kind of picture is coded without reference to another picture.

10. A moving picture coding method comprising:

changing a frame rate in a given period of moving picture data to a first set value of the frame rate;

coding respective pictures, which are included in the given period in which the frame rate is changed and are multiple kinds of pictures including at least a first kind of picture, a second kind of picture and a third kind of picture in which coding methods of the first kind of picture, the second kind of picture and the third kind of picture are different with each other, in such a manner that a code amount according to the first set value is obtained;

calculating a cumulative value of a code amount of each of the first kind of picture, the second kind of picture and the third kind of picture;

calculating a first ratio of the cumulative value of the second kind of picture to the cumulative value of the code amount of the first kind of picture or a second ratio of the cumulative value of the code amount of the third kind of picture to the cumulative value of the code amount of the first kind of picture;

estimating a change tendency of a difficulty level of coding of respective pictures included in a next period after the given period based on transition of the frame rate and transition of the first ratio or the second ratio; and obtaining a second set value of the frame rate and a third set value of a bit rate that are applied to the next period according to the change tendency of the difficulty level.

11. The moving picture coding method according to claim 10, further comprising:

lowering the second set value compared with the first set value when estimating that the difficulty level in the next period becomes higher than the difficulty level in the given period.

12. The moving picture coding method according to claim 10, further comprising:

increasing the second set value compared with the first set value when estimating that the difficulty level in the next period becomes lower than the difficulty level in the given period.

13. The moving picture coding method according to claim 12, further comprising:

setting a fourth set value of the bit rate applied to the next period to the third set value when a difference between an allowable bit rate corresponding to transmission bandwidth of a communication path to which the coded moving picture data is transmitted and the third set value is smaller than a given value.

14. The moving picture coding method according to claim 10, further comprising:

estimating transmission bandwidth usable for transmission of the coded moving picture data, regarding a communication path to which the coded moving picture data is transmitted; and obtaining the second set value of the frame rate and a fourth set value of the bit rate that are applied to the next period according to an increase-decrease tendency of the estimated transmission bandwidth and the estimated change tendency of the difficulty level.

15. The moving picture coding method according to claim 10, wherein the second kind of picture and the third kind of picture are coded with reference to another picture and the first kind of picture is coded without reference to another picture.

16. A non-transitory computer-readable recording medium recording program which causes a computer to execute process, the process comprising:
- changing a frame rate in a given period of moving picture data to a first set value of the frame rate;
- coding respective pictures, which are included in the given period in which the frame rate is changed and are multiple kinds of pictures including at least a first kind of picture, a second kind of picture and a third kind of picture in which coding methods of the first kind of picture, the second kind of picture and the third kind of picture are different with each other, in such a manner that a code amount according to the first set value is obtained;
- calculating a cumulative value of a code amount of each of the first kind of picture, the second kind of picture and the third kind of picture;
- calculating a first ratio of the cumulative value of the second kind of picture to the cumulative value of the code amount of the first kind of picture or a second ratio of the cumulative value of the code amount of the third kind of picture to the cumulative value of the code amount of the first kind of picture;
- estimating a change tendency of a difficulty level of coding of respective pictures included in a next period after the given period based on transition of the frame rate and transition of the first ratio or the second ratio; and
- obtaining a second set value of the frame rate and a third set value of a bit rate that are applied to the next period according to the change tendency of the difficulty level.

17. The non-transitory computer-readable recording medium according to claim 16, further comprising:
- lowering the second set value compared with the first set value when estimating that the difficulty level in the next period becomes higher than the difficulty level in the given period.

18. The non-transitory computer-readable recording medium according to claim 16, further comprising:
- increasing the second set value compared with the first set value when estimating that the difficulty level in the next period becomes lower than the difficulty level in the given period.

19. The non-transitory computer-readable recording medium according to claim 16, further comprising:
- estimating transmission bandwidth usable for transmission of the coded moving picture data, regarding a communication path to which the coded moving picture data is transmitted; and
- obtaining the second set value of the frame rate and a fourth set value of the bit rate that are applied to the next period according to an increase-decrease tendency of the estimated transmission bandwidth and the estimated change tendency of the difficulty level.

20. The non-transitory computer-readable recording medium according to claim 19, wherein the second kind of picture and the third kind of picture are coded with reference to another picture and the first kind of picture is coded without reference to another.

* * * * *